United States Patent
Nikolitsis

(10) Patent No.: US 9,930,995 B2
(45) Date of Patent: Apr. 3, 2018

(54) COOKING UTENSIL HANDLING DEVICE

(71) Applicant: HGN PTY LTD, Oakleigh (AU)

(72) Inventor: Harry Nikolitsis, Oakleigh (AU)

(73) Assignee: HGN PTY LTD, Oakleigh (AU)

( * ) Notice: Subject to any disclaimer, the term of this patent is extended or adjusted under 35 U.S.C. 154(b) by 0 days.

(21) Appl. No.: 15/309,575

(22) PCT Filed: May 8, 2015

(86) PCT No.: PCT/AU2015/050226
§ 371 (c)(1),
(2) Date: Nov. 8, 2016

(87) PCT Pub. No.: WO2015/168746
PCT Pub. Date: Nov. 12, 2015

(65) Prior Publication Data
US 2017/0215650 A1    Aug. 3, 2017

(30) Foreign Application Priority Data
May 8, 2014  (AU) ................................ 2014901692

(51) Int. Cl.
*A47J 45/10*    (2006.01)
(52) U.S. Cl.
CPC ..................... *A47J 45/10* (2013.01)
(58) Field of Classification Search
CPC ........... A61F 13/105; B25B 9/02; A47J 45/10
USPC ....................................................... 294/99.2
See application file for complete search history.

(56) References Cited

U.S. PATENT DOCUMENTS

| 416,849 | A | * | 12/1889 | Neale | A47G 21/001 |
| | | | | | 2/17 |
| 830,016 | A | | 9/1906 | Sims | |
| 2,436,507 | A | | 2/1948 | Ellwood | |
| 2,497,749 | A | * | 2/1950 | Wagner | A41D 13/085 |
| | | | | | 15/248.1 |
| 2,941,214 | A | * | 6/1960 | Michael | A41D 19/01594 |
| | | | | | 2/158 |

(Continued)

FOREIGN PATENT DOCUMENTS

| GB | 188835 A | 11/1922 |
| GB | 2474669 A | 4/2011 |

OTHER PUBLICATIONS

International Search Report for PCT/AU2015/050226 dated Jun. 22, 2015.

*Primary Examiner* — Stephen A Vu
(74) *Attorney, Agent, or Firm* — Heslin Rothenberg Farley & Mesti P.C.

(57) ABSTRACT

A cooking utensil handling device is provided. The device comprises a covering body that defines a receiving space, an opening to the receiving space adapted for insertion of a hand of a user, a first aperture in communication with the receiving space and adapted for extension of a first portion of a utensil therethrough, and a second aperture in communication with the receiving space and adapted for extension of a second portion of the utensil therethrough. The receiving space is adapted to receive a handling portion of the cooking utensil such that the handling portion of the cooking utensil can be grasped by the hand of the user within the receiving space. The covering body comprises a flexible intermediate portion disposed between the first aperture and the second aperture.

13 Claims, 3 Drawing Sheets

(56) References Cited

U.S. PATENT DOCUMENTS 4,089,379 A * 5/1978 Crownover .............. A01B 1/00
                                                                   172/370
2002/0096899 A1 * 7/2002 Kang ................... A47G 21/103
                                                                   294/99.2

* cited by examiner

COOKING UTENSIL HANDLING DEVICE

CROSS REFERENCE TO RELATED APPLICATIONS

This application is a national stage filing under section 371 of International Application No. PCT/AU2015/050226, filed on May 8, 2015, and published on Nov. 12, 2015 as WO 2015/168746 A1, which claims priority to Australian Application No. 2014901692, filed on May 8, 2014.

FIELD OF INVENTION

The present invention relates to a cooking utensil handling device suitable for use with, for example, a pair of tongs for providing protection for the hand from injury attributed to exposure to, for example, radiant heat during cooking.

BACKGROUND ART

While handling food during cooking there may be a risk of burn injury. With a conventional cooking utensil (e.g. tongs or a cooking fork), injury may occur to the hand due to oil splatter and exposure to radiant heat, or indeed direct flame. Although a conventional cooking glove may be worn, manual dexterity and sensibility of the hand may be compromised, rendering precise handling difficult.

The subject matter claimed herein is not limited to embodiments that solve any disadvantages or that operate only in environments such as those described above. Rather, this background is only provided to illustrate one exemplary technology area where some embodiments described herein may be practice.

SUMMARY OF INVENTION

As mentioned above, the present invention relates to a cooking utensil handling device suitable for use with, for example, a pair of tongs for providing protection for the hand from injury attributed to exposure to, for example, radiant heat during cooking.

According to one aspect of the invention there is provided a cooking utensil handling device comprising:
 a covering body that defines
  a receiving space,
  an opening to the receiving space adapted for insertion of a hand of a user, and
  at least a first aperture in communication with the receiving space and adapted for extension of a first portion of a utensil therethrough,
 wherein the receiving space is adapted to receive a handling portion of the cooking utensil such that the handling portion of the cooking utensil can be grasped by the hand of the user within the receiving space.

The device may be suitable for use with cooking utensils in applications where the hand is liable to injury attributed to, for example, oil splatter, exposure to radiant heat or direct flame. The device may also be used with other types of utensils for protection of the hand in other applications, such as during laboratory experiments.

As mentioned above, in a particular embodiment of the invention the handling device is for use in handling a pair of tongs. As such, in certain preferred embodiments, the covering body further defines a second aperture in communication with the receiving space and adapted for extension of a second portion of the utensil therethrough. When the utensil is a pair of tongs, the first aperture and the second aperture are advantageously disposed sufficiently proximate to each other for extension of respective arms of the tongs therethrough.

In certain embodiments, the covering body comprises a flexible intermediate portion disposed between the first aperture and the second aperture. In this embodiment, the intermediate portion may be in the form of a recess, particularly when compressed, for example, by the first portion and the second portion of the utensil. Such a configuration of the intermediate portion may be useful for permitting compression thereof by the first portion and the second portion of the utensil. It should be appreciated that other portions of the covering body may also be made flexible to improve user experience.

The covering body may further comprise shielding portions on either side of the intermediate portion. For example, the shielding portions may be formed from relative thick portions of material or may be provided with a shielding layer for additional shielding of the user's hand from radiant heat in use.

The first aperture and second aperture are generally disposed on one end of said covering body relative to the opening. However, configuration of the first aperture, second aperture and the opening is not necessarily so limited. Likewise, when only the first aperture is present, this may be disposed in any position relative to the opening for a particular application.

The first aperture and second aperture may be provided with an anti-slip surface adapted to prevent or alleviate slippage of the first portion and the second portion of the utensil relative to the first aperture and second aperture respectively. The anti-slip surface of each of the first aperture and the second aperture may comprise at least one tab that defines a surface that frictionally engages the first portion and the second portion of the utensil, respectively, in use. The tabs may extend inwardly into the receiving space, or may be forced outwardly from the receiving space as the cooking utensil is inserted into the receiving space and through the first aperture and second aperture. In embodiments with only the first aperture, such an anti-slip surface may be provided for that aperture only.

In certain embodiments, the handling device may include tabs disposed adjacent the first and second apertures that extend into the receiving space. These may or may not provide an anti-slip surface for alleviating slippage of the cooking utensil. In preferred embodiments, the outer surfaces of the tabs are provided with texture, such as ribbing, to provide gripping surfaces for the user. In this embodiment, in use the tabs are disposed between the hand of the user and the arms of the utensil.

The covering body may take on any suitable form. For example, in one embodiment, the covering body is a substantially concave body. The covering body may also be V-shaped or U-shaped.

In one embodiment, the covering body is integrally formed. In an alternative embodiment, the covering body may comprise a plurality of assembled portions. Preferably, the covering body is made of heat-resistance material, for example a flexible silicone material. Depending on the field of use, the covering body may also be made of chemical-resistant material or cold-resistant material. Further, the covering body may also be made of a washable material.

The covering body may also be provided with a stowage mechanism. For example, the stowage mechanism may include a hook for facilitating hanging of the covering body.

The present invention consists of features and a combination of parts hereinafter fully described and illustrated in the accompanying drawings, it being understood that various changes in the details may be made without departing from the scope of the invention or sacrificing any of the advantages of the present invention.

BRIEF DESCRIPTION OF ACCOMPANYING DRAWINGS

To further clarify various aspects of some embodiments of the present invention, a more particular description of the invention will be rendered by references to specific embodiments thereof, which are illustrated in the appended drawings. It should be appreciated that these drawings depict only typical embodiments of the invention and are therefore not to be considered limiting on its scope. The invention will be described and explained with additional specificity and detail through the accompanying drawings in which.

DETAILED DESCRIPTION OF THE PREFERRED EMBODIMENTS

Figure 1:
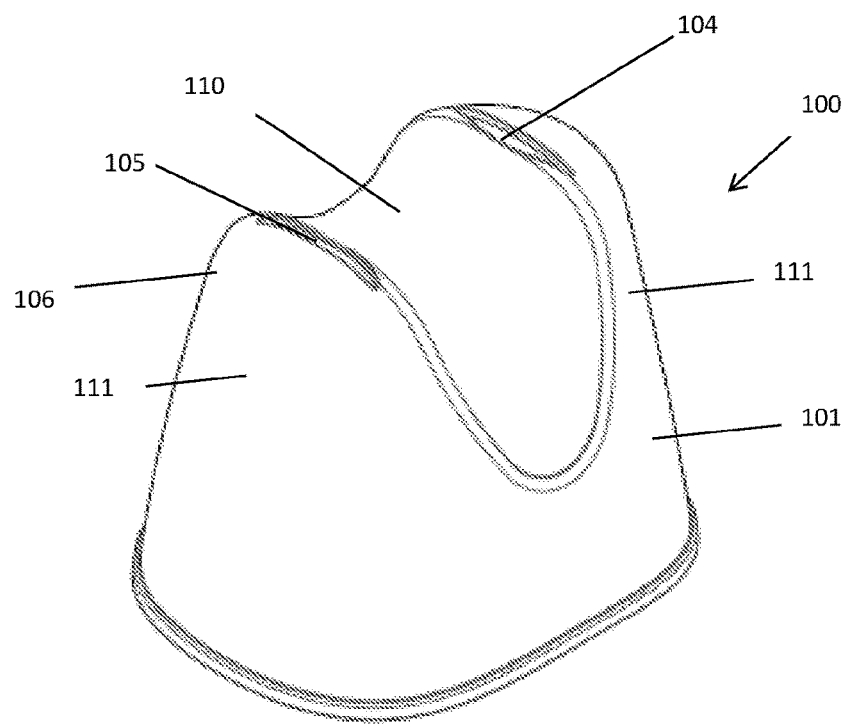
FIG. 1 illustrates a perspective view of an embodiment of a cooking utensil handling device according to the invention.
Figure 2:
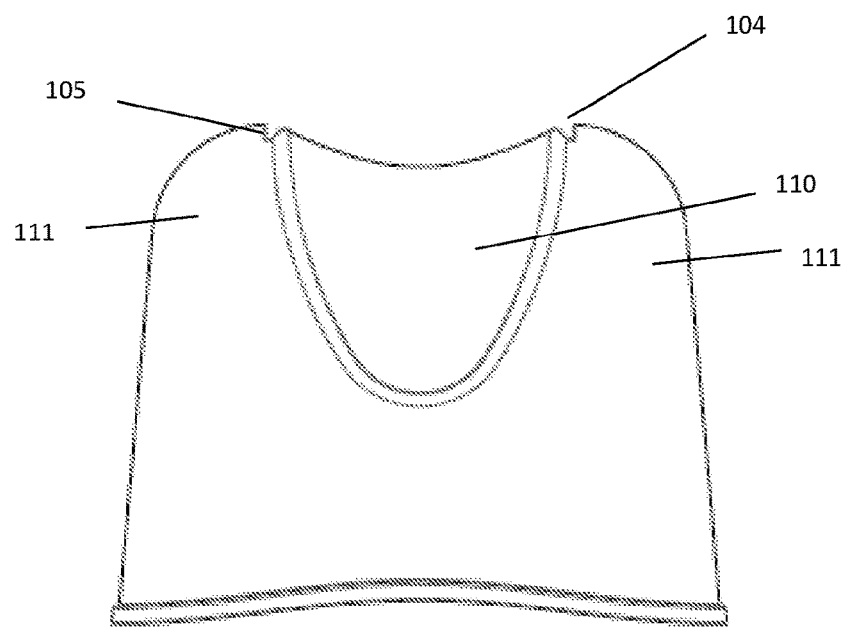
FIG. 2 illustrates a front view of the cooking utensil handling device of FIG. 1.
Figure 3:
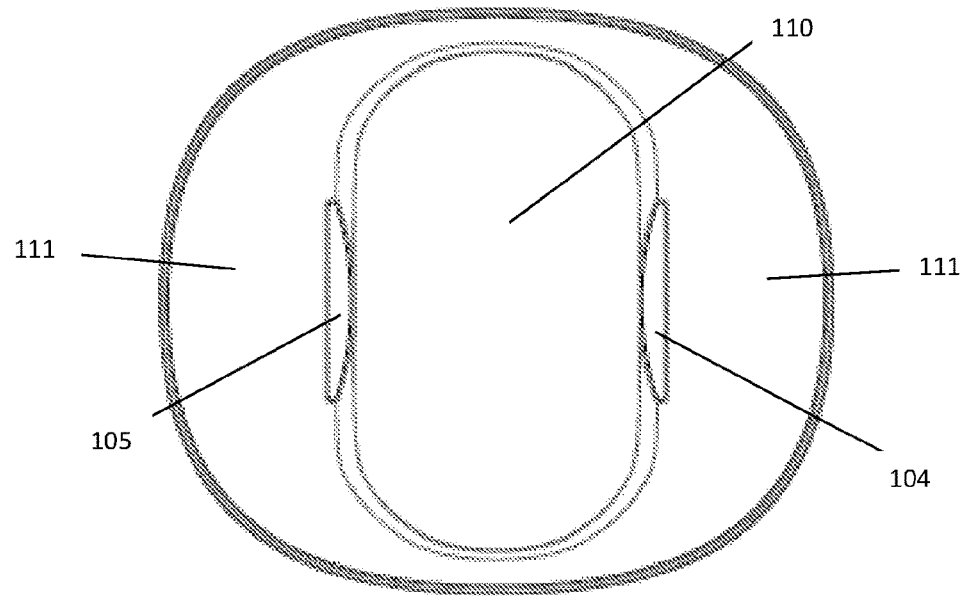
FIG. 3 illustrates a top view of the cooking utensil handling device of FIG. 1.
Figure 4:
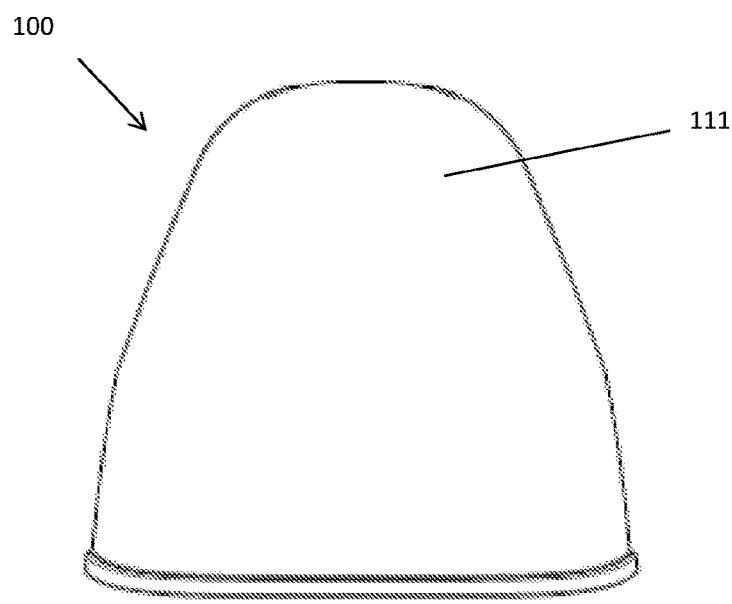
FIG. 4 illustrates an end view of the cooking utensil handling device of FIG. 1.

The present invention provides a cooking utensil handling device. Hereinafter, this specification will describe the present invention according to the preferred embodiments. It is to be understood that limiting the description to the preferred embodiments of the invention is merely to facilitate discussion of the present invention and it is envisioned without departing from the scope of the appended claims.

Referring to the Figures, a cooking utensil handling device 100 is illustrated. The handling device 100 is adapted for use with a pair of barbeque tongs (not shown) and includes a covering body 101 that defines a receiving space 102 (see FIGS. 5 and 6) for receiving the hand of a user. An opening 103 is provided on one end of the handling device 100. A first aperture 104 and second aperture 105 are disposed on an opposing end 106 of the handling device 100.

The first aperture 104 and the second aperture 105 are in spatial communication with the receiving space 103 and are adapted to receive a first arm and a second arm of the tongs respectively. The opening 103 is also in spatial communication with the receiving space 102. In use, a user of the handling device 100 inserts a hand through the opening 103 into the receiving space 102 for grasping of a handling portion of the tongs and handling of the tongs.

The first aperture 104 and the second aperture 105 are disposed sufficiently proximate to each other to facilitate easy extension of the first arm and the second arm of the tongs therethrough. That is, the distance between the first aperture 104 and second aperture 105 is within the working range distance between the first arm and the second arm of the tongs. Indeed, the first aperture 104 and second aperture 105 may be suitably positioned to provide frictional engagement of the arms of the tongs in use as described in more detail below.

The handling device 100 includes a flexible intermediate portion 110 disposed between the first aperture 104 and the second aperture 105. The flexible intermediate portion 110 compresses as the first arm and second arm of the tongs move towards one another. This occurs, for example, when food is to be grasped by the tongs. This advantageously ensures ease of use of the handling device 100 without undue force being required to move the arms of the tongs towards one another.

Shielding portions 111 are provided on either side of the intermediate portion 110. The shielding portions 111 comprise a thicker portion of material, or an additional layer of insulating material which shield parts of the user's hand that may be most vulnerable to damage by the effects of radiant heat emitted from the cooking surface.

Figure 5:
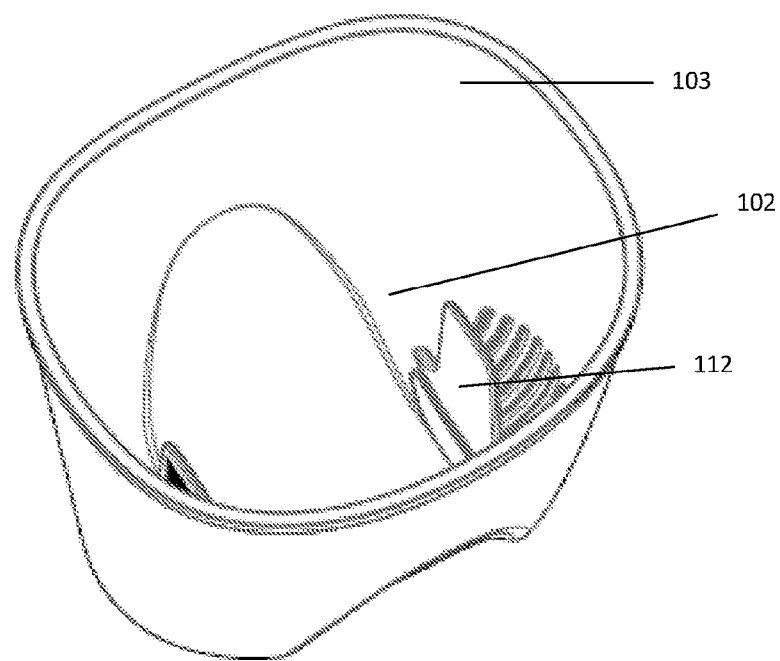
FIG. 5 illustrates a perspective bottom view of the cooking utensil handling device of FIG. 1.
Figure 6:
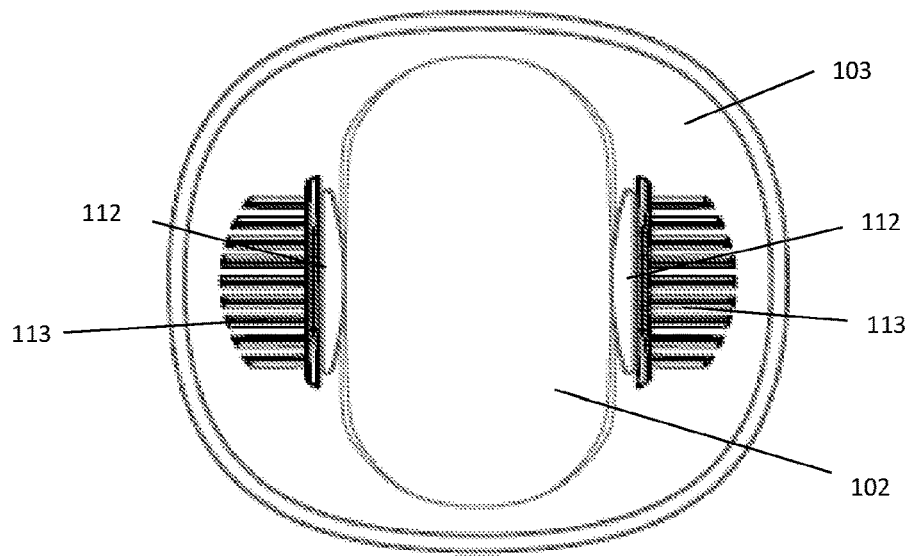
FIG. 6 illustrates a bottom view of the cooking utensil handling device of FIG. 1.

The first aperture 104 and second aperture 105 are provided with disposed next to internal tabs 112 (see FIGS. 5 and 6). The tabs act as an anti-slip surface for preventing slippage of the first arm and second arm of the tongs relative to the first aperture 104 and the second aperture 105 respectively. The tabs 112 extend inwardly into the receiving space 102 and provide surface adapted to frictionally engage the first arm and second arm of the tongs. The tabs 112 may also guard the user's hand from any heat absorbed by the arms of the tongs. Ribbed surfaces 113 are also provided for added traction.

For each of the first aperture 104 and the second aperture 105, the tabs 112 extend inwardly from a periphery of the aperture 104, 105 into the receiving space 102 and are resiliently biased to frictionally engage a surface of the corresponding arm of the tongs as it is passed through a corresponding aperture 104, 105.

The covering body may be formed from a number of portions of heat resistant material. As discussed previously and as illustrated, the covering body 101 is moulded and, therefore, integrally formed from a unitary piece of heat resistance material.

In use, the first arm and second arm of the tongs are inserted through the opening 103 and into the receiving space 102. As the tongs are progressively inserted through the receiving space 102, the arms of the tongs pass through the first aperture 104 and second aperture 105 respectively until the handling portion of the tongs is received entirely within the receiving space 102. The tongs are then ready for handling from within the receiving space 102, the user's hand being protected by the covering body 101.

Unless the context requires otherwise or specifically stated to the contrary, integers, steps or elements of the invention recited herein as singular integers, steps or elements clearly encompass both singular and plural forms of the recited integers, steps or elements.

Throughout this specification, unless the context requires otherwise, the word "comprise", or variations such as "comprises" or "comprising", will be understood to imply the inclusion of a stated step or element or integer or group of steps or elements or integers, but not the exclusion of any other step or element or integer or group of steps, elements or integers. Thus, in the context of this specification, the term "comprising" is used in an inclusive sense and thus should be understood as meaning "including principally, but not necessarily solely".

It will be appreciated that the foregoing description has been given by way of illustrative example of the invention and that all such modifications and variations thereto as would be apparent to persons of skill in the art are deemed to fall within the broad scope and ambit of the invention as herein set forth.

The invention claimed is:

1. A cooking utensil handling device comprising:
a covering body that defines
a receiving space,
an opening to the receiving space adapted for insertion of a hand of a user,
a first aperture in communication with the receiving space and adapted for extension of a first portion of a utensil therethrough, and
a second aperture in communication with said receiving space and adapted for extension of a second portion of the utensil therethrough,
wherein the receiving space is adapted to receive a handling portion of the cooking utensil such that the handling portion of the cooking utensil can be grasped by the hand of the user within the receiving space, and
wherein said covering body comprises a flexible intermediate portion disposed between said first aperture and said second aperture.

2. A handling device according to claim 1, wherein said intermediate portion is in the form of a recess.

3. A handling device according to claim 1, wherein said covering body comprises shielding portions on either side of said intermediate portion.

4. A handling device according to claim 3, wherein said shielding portions are formed from relative thick portions of material or are provided with a shielding layer for additional shielding of said user's hand from radiant heat in use.

5. A handling device according to claim 1, wherein said first aperture and said second aperture are disposed on one end of said covering body relative to said opening.

6. A handling device according to claim 1, wherein said first aperture and said second aperture are provided with an anti-slip surface adapted to prevent or alleviate slippage of the first portion and said second portion of the utensil relative to said first aperture and said aperture respectively.

7. A handling device according to claim 6, wherein said anti-slip surface of each of the first aperture and the second aperture comprises at least one tab that defines a surface that frictionally engages said first portion and said second portion of the utensil, respectively, in use.

8. A handling device according to claim 1, comprising tabs disposed adjacent the first and second apertures that extend into the receiving space.

9. A handling device according to claim 8, wherein outer surfaces of the tabs are provided with texture to provide gripping surfaces for the user.

10. A handling device according to claim 9, wherein the texture is ribbing.

11. A handling device according to claim 1, wherein said covering body is integrally formed.

12. A handling device according to claim 1, wherein said covering body is made of heat resistant material.

13. A handling device according to claim 12, wherein said heat resistant material comprises a flexible silicone material.

* * * * *